United States Patent
Qi et al.

(10) Patent No.: US 11,394,199 B2
(45) Date of Patent: Jul. 19, 2022

(54) INTELLIGENT CURRENT LIMITING FOR SOLID-STATE SWITCHING

(71) Applicant: ABB Schweiz AG, Baden (CH)

(72) Inventors: Li Qi, Cary, NC (US); Taosha Jiang, Cary, NC (US); Antonello Antoniazzi, Milan (IT)

(73) Assignee: ABB SCHWEIZ AG, Baden (CH)

( * ) Notice: Subject to any disclaimer, the term of this patent is extended or adjusted under 35 U.S.C. 154(b) by 0 days.

(21) Appl. No.: 17/018,020

(22) Filed: Sep. 11, 2020

(65) Prior Publication Data

US 2022/0085600 A1  Mar. 17, 2022

(51) Int. Cl.
*H02H 9/02* (2006.01)
*H02H 3/02* (2006.01)
(Continued)

(52) U.S. Cl.
CPC .............. *H02H 9/02* (2013.01); *H01H 71/10* (2013.01); *H02H 3/02* (2013.01); *H02H 9/023* (2013.01);
(Continued)

(58) Field of Classification Search
CPC ........ H01H 71/10; H01H 3/0213; H01H 3/02; H01H 3/021; H01H 9/54; H01H 33/02;
(Continued)

(56) References Cited

U.S. PATENT DOCUMENTS

| 8,830,642 B2 | 9/2014 | Antoniazzi et al. |
| 10,566,787 B2 | 2/2020 | Rodrigues et al. |

(Continued)

FOREIGN PATENT DOCUMENTS

| CN | 107634506 A | 1/2018 |
| CN | 109861567 A | 6/2019 |

(Continued)

OTHER PUBLICATIONS

Atom Power, "The Atom Panel as a Motor Control Center," AS3P100 Data Sheet, dated 2017, 1 pp., Atom Power, Inc., Huntersville, USA, available at https://docs.wixstatic.com/ugd/1baea3_834d1a1525a64014921cc554d1b61944.pdf, last accessed Aug. 12, 2020.

(Continued)

*Primary Examiner* — Danny Nguyen

(74) *Attorney, Agent, or Firm* — Greenberg Traurig, LLP

(57) ABSTRACT

Systems, methods, techniques and apparatuses of high current protection are disclosed. One exemplary embodiment is a power system comprising a solid-state circuit breaker including a solid-state switching device, an energy dissipation branch, an assistive branch, and a controller. The energy dissipation branch is coupled in parallel with the solid-state switching device and includes an energy dissipation device. The assistive branch is coupled in parallel with the solid-state switching device and includes a resistor, an inductor, and a galvanic isolation switching device coupled together in series. The controller is configured to determine the solid-state circuit breaker is conducting a high magnitude current, select a continuous current limiting mode or an intermittent current limiting mode, and operate the solid-state switching device based on the selected current limiting mode.

18 Claims, 5 Drawing Sheets

(51) Int. Cl.
*H01H 71/10* (2006.01)
*H01H 3/02* (2006.01)
*H02H 3/087* (2006.01)

(52) U.S. Cl.
CPC ........... *H01H 3/0213* (2013.01); *H02H 3/025* (2013.01); *H02H 3/087* (2013.01)

(58) Field of Classification Search
CPC .. H02H 9/00; H02H 9/02; H02H 3/02; H02H 9/023; H02H 3/025; H02H 3/00; H02H 3/087
USPC ........................................ 361/2–13
See application file for complete search history.

(56) References Cited

U.S. PATENT DOCUMENTS

| | | | |
|---|---|---|---|
| 2005/0116662 A1 | 6/2005 | Sanchez | |
| 2005/0146814 A1 | 7/2005 | Sellier et al. | |
| 2014/0226247 A1* | 8/2014 | Gaxiola | H02H 3/087 361/100 |
| 2014/0299579 A1* | 10/2014 | Hartmann | H02H 3/021 218/145 |
| 2015/0002977 A1* | 1/2015 | Dupraz | H01H 9/542 361/115 |
| 2015/0236502 A1* | 8/2015 | Xu | H02H 3/025 361/93.9 |
| 2019/0341213 A1 | 11/2019 | Kouroussis et al. | |

FOREIGN PATENT DOCUMENTS

| | | |
|---|---|---|
| CN | 109995114 A | 7/2019 |
| WO | 2015168830 A1 | 11/2015 |

OTHER PUBLICATIONS

L. Qi et al., "Design of Solid-State Circuit Breaker-Based Protection for DC Shipboard Power Systems," IEEE Journal of Emerging and Selected Topics in Power Electronics, dated Mar. 2017, pp. 260-268, vol. 5, No. 1, IEEE, Piscataway, USA.
R. K. Smith et al., "Solid State Distribution Current Limiter and Circuit Breaker: Application Requirements and Control Strategies," IEEE Transactions on Power Delivery, dated Jul. 1993, pp. 1155-1164, vol. 8, No. 3, IEEE, Piscataway, USA.
A. Abramovitz et al., "Survey of Solid-State Fault Current Limiters," IEEE Transactions on Power Electronics, dated Jun. 2012, pp. 2770-2782, vol. 27, No. 6, IEEE, Piscataway, USA.
J. Langston et al., "Testing Operation and Coordination of DC Solid State Circuit Breakers," IECON 2018—44th Annual Conference of the IEEE Industrial Electronics Society, date Dec. 31, 2018, pp. 3445-3452, IEEE, Piscataway, USA.
C. Li et al., "Modulated Low Fault-Energy Protection Scheme for DC Smart Grids," IEEE Transactions on Smart Grid, dated Jan. 2020, pp. 84-94, vol. 11, No. 1, IEEE, Piscataway, USA.
D. Philpott et al., "Solid-State Fault Current Limiters for Residential Houses and Commercial Buildings," IEEE Transactions on Industry Applications, dated Aug. 2019, pp. 3431-3436, vol. 55, No. 4, IEEE, Piscataway, USA.
L. Qi et al., "Solid State Fault Current Limiting for DC Distribution Protection," 2017 IEEE Electric Ship Technologies Symposium (ESTS), dated Oct. 19, 2017, pp. 187-191, IEEE, Piscataway, USA.
Y. Zhou et al., "iBreaker: Intelligent Tri-mode Solid State Circuit Breaker Technology," 2018 IEEE International Power Electronics and Application Conference and Exposition (PEAC), dated Dec. 27, 2018, 7 pp., IEEE, Piscataway, USA.
Extended European Search Report, issued by the European Patent Office, regarding corresponding patent application Serial No. EP 21196137.0; dated Feb. 2, 2022; 9 pages.

* cited by examiner

INTELLIGENT CURRENT LIMITING FOR SOLID-STATE SWITCHING

BACKGROUND

The present disclosure relates generally to high current protection. Solid-state circuit breakers can be incorporated into power systems for fast isolation from faults. For these power systems, fault discrimination and protection selectively is limited by the short time frame required by the thermal limit and overcurrent limits of the semiconductors used in the solid-state circuit breakers. To reduce a magnitude of fault current conducted by a solid-state circuit breaker, some circuit breakers use repetitive switching. There remain unmet needs including reducing harmonic distortion caused by solid-state circuit breaker operation and reducing stress on solid-state circuit breakers. For example, repetitive switching, while reducing fault current magnitudes, generates harmonic distortion that can damage power system components. Furthermore, repetitive switching causes thermal stress on existing solid-state circuit breakers. In view of these and other shortcomings in the art, there is a significant need for the apparatuses, methods, systems and techniques disclosed herein.

DISCLOSURE OF ILLUSTRATIVE EMBODIMENTS

For the purposes of clearly, concisely and exactly describing non-limiting exemplary embodiments of the disclosure, the manner and process of making and using the same, and to enable the practice, making and use of the same, reference will now be made to certain exemplary embodiments, including those illustrated in the figures, and specific language will be used to describe the same. It shall nevertheless be understood that no limitation of the scope of the present disclosure is thereby created, and that the present disclosure includes and protects such alterations, modifications, and further applications of the exemplary embodiments as would occur to one skilled in the art with the benefit of the present disclosure.

SUMMARY OF THE DISCLOSURE

Exemplary embodiments of the disclosure include systems, methods, techniques and apparatuses for high current protection. Further embodiments, forms, objects, features, advantages, aspects and benefits of the disclosure shall become apparent from the following description and drawings.

DETAILED DESCRIPTION OF ILLUSTRATIVE EMBODIMENTS

Figure 1:
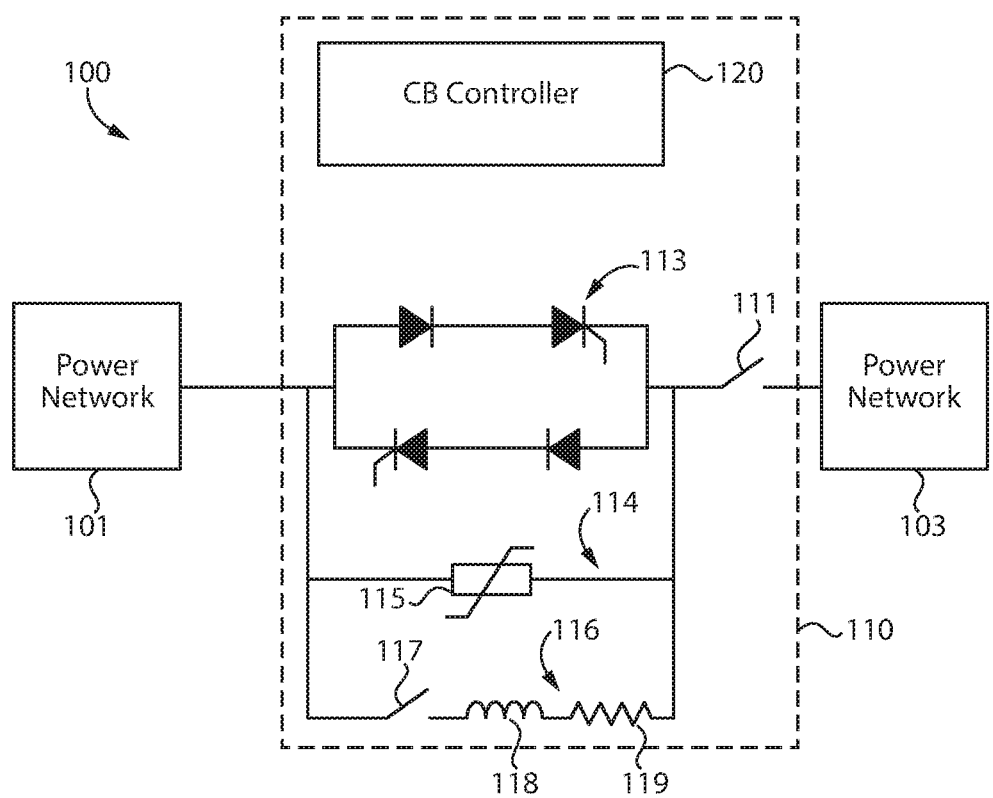
FIGS. 1-2 illustrate exemplary power systems.

With reference to FIG. 1, there is illustrated an exemplary power system 100 including a solid-state circuit breaker 110 coupled between power networks 101 and 103. Solid-state circuit breaker 110 is structured to conduct alternating current or direct current between networks 101 and 103. In certain embodiments, power networks 101 and 103 are portions of a utility grid, a microgrid, or a motor control center, to name but a few examples.

Solid-state circuit breaker 110 includes a galvanic isolation switching device 111 coupled in series with a solid-state switching device 113. Galvanic isolation switching device 111 may be structured to open while device 111 is not conducting a current. In certain embodiments, galvanic isolation switching device 111 is a mechanical disconnector, to name but one example.

Solid-state switching device 113 is structured to selectively conduct current from power network 101 to power network 103, and from power network 103 to power network 101. In the illustrated embodiment, solid-state switching device 113 includes two branches coupled in an anti-parallel configuration, each branch including a diode and an integrated gate-commutated thyristor (IGCT). In certain embodiments, the IGCTs may be replaced by a reverse-blocking IGCT (RB-IGCT). In other embodiments, solid-state switching device 113 may include a different topology and different components. For example, solid-state switching device 113 may include RB-IGCTs, insulated gate bipolar transistors (IGBTs), bipolar junction transistors (BJTs), metal-oxide-semiconductor field-effect transistors (MOSFETs), gate turn-off thyristors (GTOs), MOS-controlled thyristors (MCTs), silicon carbide (SiC) switching devices, gallium nitride (GaN) switching devices, or any other type of semiconductor-based switching device structured to block or interrupt the conduction of current.

Solid-state circuit breaker 110 includes an energy dissipation branch 114 coupled in parallel with solid-state switching device 113. Energy dissipation branch 114 is structured to dissipate energy accumulated from toggling solid-state switching device 113. In the illustrated embodiment, energy dissipation branch 114 includes a voltage dependent resistor 115 which is configured and provided as a metal-oxide varistor (MOV) in the illustrated embodiment, but may comprise a silicon carbide varistor, selenium cells, or other types of voltage-dependent resistors or voltage clamping elements or arrangements.

Solid-state circuit breaker 110 includes an assistive branch 116 coupled in parallel with solid-state switching device 113 and energy dissipation branch 114. Assistive branch 116 is structured to conduct current having a reduced magnitude while solid-state switching device 121 is open and structured to assist the continuous or intermittent current limiting of the solid-state switching device 121. Assistive branch 116 includes a switching device 117, an inductor 118, and a resistor 119. Switching device 117 may be any type of switching device structured to selectively conduct current. For example, switching device 117 may be a mechanical circuit breaker, to name but one example. The inductor 118 is selected to have an inductance on the order of mH, for example, less than 1 mH for DC applications and a few mH for AC applications, the inductance of inductor 118 being much lower than the system inductance in DC and AC applications. Inductor 118 and resistor 119 are structured to provide an impedance that share a portion of the current flow with the energy dissipation branch 114 when the solid-state switching device 121 is off. Inductor 118 is structured to provide an AC impedance to limit the time rate of change of current through assistive branch 116. Resistor 119 is structured to provide a resistance to dissipate energy and reduce a magnitude of current conducted through assistive branch 116.

Solid-state circuit breaker 110 includes a controller 120 structured to operate the controllable devices of solid-state circuit breaker 110 to prevent overcurrent and overheat damages during faults and transients. Controller 120 may include measuring devices structured to measure electrical characteristics of the current conducted by solid-state circuit breaker 110, such as current magnitudes or voltage magnitudes, to name but a few examples. It is important to note that controller 120 operates solid-state circuit breaker 110 to perform the conventional function of a circuit breaker, i.e. opening in order to interrupt a high current, but also performs additional functions described herein, such operating solid-state circuit breaker 110 to limit current conducted by solid-state circuit breaker 110 and identifying a source of high current before responding to the high current, to name but a few examples. Controller 120 operates solid-state circuit breaker 110 in one of four modes: a normal mode, a continuous current limiting mode, an intermittent current limiting mode, and a protection mode.

In normal mode, solid-state switching device 113 and galvanic isolation switching device 111 are closed, allowing a nominal current to be conducted through solid-state circuit breaker 110 by way of solid-state switching device 113. Switching device 117 is also closed, but due to resistor 119 and inductor 118, only a small portion of the nominal current is conducted through assistive branch 116.

In continuous current limiting mode, solid-state switching device 113 is open, galvanic isolation switching device 111 is closed, and switching device 117 is closed. Current previously conducted through solid-state switching device 113 is now conducted by energy dissipation branch 114 and assistive branch 116, causing some of the energy of the current to dissipate, thereby reducing the magnitude of the high magnitude current. The maximum current magnitude reduction is determined by the sizing of resistor 119. For example, resistor 119 may be structured to limit the magnitude of current conducted through solid-state circuit breaker 110 in continuous current limiting mode to 1.5 times the nominal current, to name but one example.

In intermittent current limiting mode, galvanic isolation switching device 111 and switching device 117 remain closed while solid-state switching device 113 is repeatedly toggled, resulting in intermittent current conducted through solid-state switching device 113, energy dissipation branch 114, and assistive branch 116. Controller 120 is configured to operate the solid-state switching device 113 by transmitting a series of pulses having variable pulse widths and variable pulse rates. The pulse widths and pulse widths are varied in order for the output current of solid-state circuit breaker 110 to be conformed to a current reference value. The current reference value is a current magnitude limit and may include both a current magnitude maximum and a current magnitude minimum. As the current reference value decreases, the pulse rate increases. In addition to the current reference value, operating conditions such as system inductance influence the pulse rate and pulse width. For example, as system inductance increases, pulse rate decreases and pulse width increases. Controller 120 may also determine the pulse rate and pulse width based on factors including time current curves, total harmonic distortion requirements, power level requirements, and protection level, to give but a few examples.

As a result of the toggling of solid-state switching device 113, controller 120 can reduce the magnitude of the current conducted by solid-state circuit breaker 110 further than the reduction of magnitude during the continuous current limiting mode. For example, while the continuous current limiting mode might reduce a current to 1.5 times the nominal current, intermittent current limiting mode could reduce the same current to a value between 0.5 and 1.5 times the nominal current, to give but one example.

During intermittent current limiting mode, current is shared by energy dissipation branch 114 and assistive branch 116 due to the sizing of resistor 119. For example, resistor 119 may be sized so that equal portions of energy of a high magnitude current are dissipated by energy dissipation branch 114 and assistive branch 116 while operating solid-state switching device 113 in the intermittent current limiting mode. In another example, resistor 119 may be sized such that both energy dissipation branch 114 and assistive branch 116 conduct at least 40% of the high magnitude current, to give but one example. In still another example, resistor 119 is sized so that the amount of energy dissipated by energy dissipation branch 114 is within 30% of the energy dissipated by assistive branch 116 while operating solid-state switching device 113 in the intermittent current limiting mode.

In protection mode, solid-state switching device 113 and switching device 117 are opened, interrupting the current being conducted by solid-state circuit breaker 110. Galvanic isolation switching device 111 is also opened at a predetermined time after switching devices 113 and 117 are opened, in order to ensure galvanic isolation switching device 111 is not conducting current while it is opening. It shall be appreciated that any or all of the foregoing features of solid-state circuit breaker 110 may also be present in the other solid-state circuit breakers disclosed herein.

Figure 2:
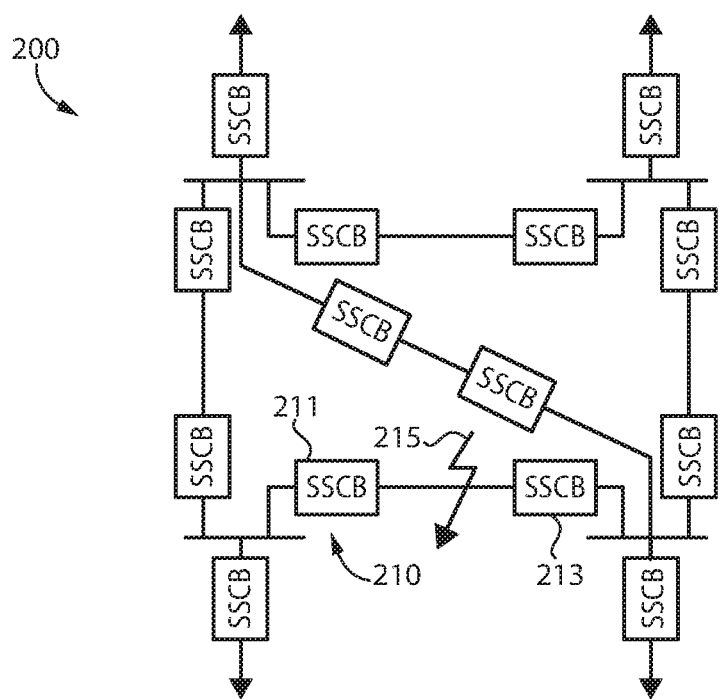

With reference to FIG. 2, there is illustrated an exemplary power system 200 including a plurality of exemplary solid-state circuit breakers 210. Power system 200 is arranged in a meshed configuration. In other embodiments, power system 200 may be arranged in another configuration, such as a ring configuration or a distributed configuration. Power system 200 may be structured to conduct AC or DC, or a combination thereof.

The plurality of solid-state circuit breakers 210 includes solid-state circuit breaker 211 and solid-state circuit breaker 213. In certain embodiments, one or more of the plurality of solid-state circuit breakers 210 may be replaced by another type of protection device, such as a mechanical circuit breaker or fuse.

In the illustrated system 200, a short-circuit fault 215 is occurring between solid-state circuit breaker 211 and solid-state circuit breaker 213. The plurality of solid-state circuit breakers 210 includes solid-state circuit breakers both upstream and downstream of fault 215.

Each of the plurality of solid-state circuit breakers 210 monitors the current they are conducting. For each solid-state circuit breaker of the plurality of solid-state circuit breakers 210 that determine the solid-state circuit breaker is conducting a high magnitude current, the solid-state circuit breaker selects and operates in either the continuous current limiting mode or intermittent current limiting mode. Once the high magnitude current is limited by the selected mode, each controller, either individually or collectively, determines the cause of the high magnitude current and mitigates the high current. For example, since fault 215 is a short-circuit fault, solid-state circuit breakers 211 and 213, being the closest solid-state circuit breakers to fault 215, enter protection mode and open in order to remove fault 215. Once fault 215 is repaired, solid-state circuit breakers 211 and 213 return to normal mode and power system 200 is restored.

In certain embodiments, the controllers of each solid-state circuit breaker coordinate in a distributed fashion in order to determine the cause of the high magnitude current and mitigate the high magnitude current. In other embodiments, a central control system receives information from the controllers of each solid-state circuit breaker to determine a cause of the high magnitude current and transmit commands to the solid-state circuit breakers in order to mitigate the high magnitude current.

Figure 3:
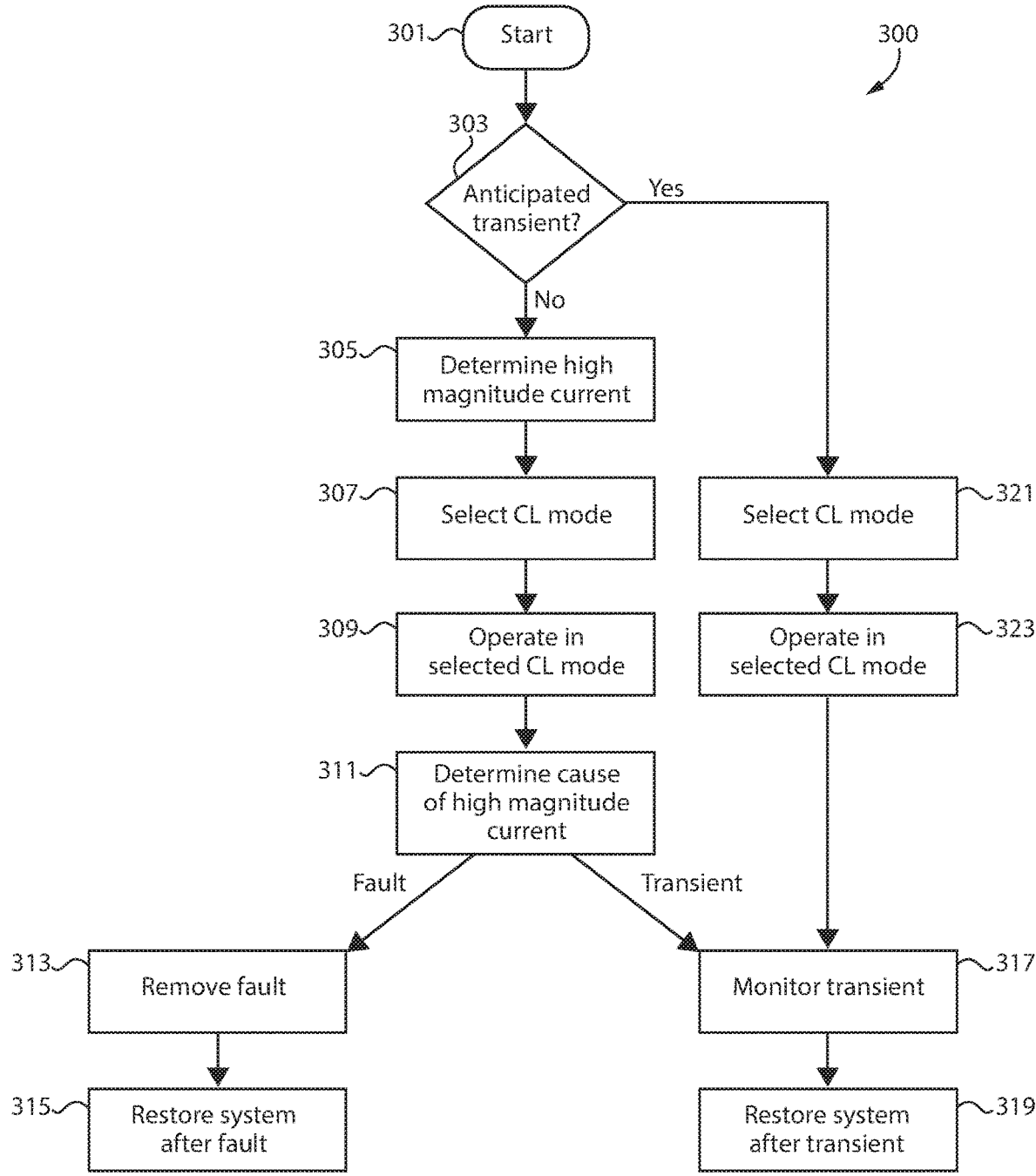
FIG. 3 is a flowchart illustrating an exemplary high current protection process.

With reference to FIG. 3, there is a flowchart illustrating an exemplary protection process 300 for an exemplary solid-state circuit breaker, such as solid-state circuit breaker 110 in FIG. 1. Process 300 may be implemented in whole or in part in one or more of the controllers of the solid-state circuit breakers disclosed herein. It shall be further appreciated that a number of variations and modifications to process 300 are contemplated including, for example, the omission of one or more aspects of process 300, the addition of further conditionals and operations, and the reorganization or separation of operations and conditionals into separate processes.

Process 300 begins at start operation 301 where a high current condition begins to occur while the solid-state circuit breaker is operating in normal mode. A high current condition occurs when an event, such as a fault or a transient, causes the solid-state circuit breaker to conduct a high magnitude current with a magnitude greater than the nominal current conducted by the solid-state circuit breaker. In certain embodiments, a high magnitude current may be considered a current with a magnitude greater than twice the magnitude of the nominal current.

Process 300 proceeds to conditional 303. If the high current condition is an anticipated transient, process 300 proceeds to operation 321. An anticipated transient is an event known by the solid-state circuit breaker, which will cause a high magnitude current to be conducted through the solid-state circuit breaker unless the solid-state circuit breaker limits the conducted current. The controller may receive information for anticipating transients from another solid-state circuit breaker controller, or a central control system. The controller may also determine an anticipated transient based on previous transients conducted by the solid-state circuit breaker.

If the high current condition was not anticipated, process 300 proceeds to operation 305 where the controller determines the solid-state circuit breaker is conducting a high magnitude current. The controller may determine the solid-state circuit breaker is conducting a high magnitude current by measuring the current conducted by the solid-state circuit breaker using a current sensor, to give but one example.

Process 300 proceeds to operation 307 where the controller selects a current limiting mode. When determining whether to select the continuous current limiting mode or the intermittent current limiting mode, the controller may consider a number of factors, including actual and desired current magnitudes, thermal ratings, and power quality requirements, to give but a few examples.

Continuous current limiting mode may be selected over intermittent current limiting mode due to power quality requirements since continuous current limiting mode generates less distortion than intermittent current limiting mode. The current oscillations caused by repetitive toggling cause voltage oscillations on the grid side of the solid-state circuit breaker. These oscillations may damage power system components. For example, the controller may select the continuous current limiting mode or the intermittent current limiting mode based on a current reference value and a power quality requirement. The power quality requirement may include a voltage distortion threshold, a current distortion threshold, an overvoltage threshold, and an undervoltage threshold.

Intermittent current limiting mode may be selected over continuous current limiting mode because intermittent current limiting mode is able to reduce the magnitude of the high magnitude current more than continuous current limiting mode. For example, the controller may select the intermittent current limiting mode if operating the solid-state switching device in the continuous current limiting mode would not reduce a magnitude of the high magnitude current to a desired current reference value.

Intermittent current limiting mode may also be selected over continuous current limiting mode if an expected amount of energy dissipated in the assistive branch exceeds an energy dissipation threshold. The energy dissipation threshold may include a thermal rating, to name but one example. The controller may determine the expected amount of energy dissipated in the assistive branch based on an estimated time length of operating the solid-state circuit breaker in the current limiting mode, to name but a one example. In intermittent current limiting mode, the energy dissipated by the solid-state circuit breaker is shared by the assistive branch and the energy dissipation branch, as opposed to the continuous current limiting mode where energy is primarily dissipated in the assistive branch. Therefore, the controller may select intermittent current limiting mode to operate solid-state circuit breaker if the controller determines operating the solid-state circuit breaker in continuous current limiting mode would cause energy dissipation in the assistive branch that is greater than the energy dissipation threshold of the assistive branch.

Process 300 proceeds to operation 309 where the controller operates the solid-state circuit breaker in the current limiting mode selected in operation 307. By operating the solid-state circuit breaker in the current limiting mode, the controller has sufficient time to identify the cause of the high current condition. Furthermore, operating the solid-state circuit breaker in one of the current limiting modes before the cause of the high current condition is identified avoids opening the solid-state circuit breaker unnecessarily for normal transients, such as transformer inrush and capacitor charging, thereby reducing system downtime.

Process 300 proceeds to operation 311 where the controller determines whether the cause of the high current condition is a fault or a transient. A fault may include a short circuit fault or another type of condition that requires isolation and removal before the power system can operate normally again. A transient may include an inrush current or another condition that will last for a limited amount of time such that the solid-state circuit breaker may return to normal mode without isolation once the transient terminates.

The controller may receive electrical characteristics of the solid-state circuit breaker before and while operating the solid-state switching device in the selected current limiting mode, and use the received electrical characteristics to determine whether the cause of the high current condition is a fault or a transient. The electrical characteristics may include measured currents and voltages to name but a few examples. The controller may also use electrical characteristics measured at other solid-state circuit breakers in the same power system.

For example, the controller may determine the cause of the high current condition is an inrush transformer transient based on the second harmonics of the measured current. In another example, the controller may determine the cause of the high current condition is a fault based on a decreasing voltage, or a transient based on a steady voltage. In still another example, the controller may determine the cause of the high current condition is a capacitor charging transient based on a measured voltage that increases until it reaches a nominal voltage value.

If the cause of the high current condition is a fault, process 300 proceeds to operation 313 where the fault is removed. In certain embodiments, the controller removes the fault by entering protection mode opening the semiconductor switching device. For power systems including a plurality of exemplary solid-state circuit breakers, once the fault has been identified and located, the solid-state circuit breaker(s) closest to the fault enter protection mode while the other solid-state circuit breakers that were in a current limiting mode return to normal mode.

In certain embodiments, the power system includes a plurality of solid-state circuit breakers and a plurality of fuses or mechanical circuit breakers. The fuse or mechanical circuit breaker opens at the faulted branch to remove the fault, while the remaining protection devices remain closed. If the fuse or mechanical circuit breaker at the faulted branch fails to open, the solid-state circuit breaker closest to the faulty fuse or mechanical circuit breaker serves as a backup breaker. In response to determining the fuse or mechanical circuit breaker has failed, the switching device on the assistive branch is opened, the solid-state switching device is opened or remains opened, and the galvanic isolation switch is opened.

Process 300 proceeds to operation 315 where the power system restores operation after the fault is removed. The solid-state circuit breaker in protection mode is returned to normal mode. For solid-state circuit breakers locked under protection mode or a current limiting mode for a predefined period of time, the solid-state circuit breaker returns to normal mode after the time period.

If the cause of the high current condition is a transient, process 300 proceeds to operation 317 where the controller monitors the transient until the transient terminates. Process 300 then proceeds to operation 319 where the system is restored to normal operation and the solid-state circuit breaker returns to normal mode. For solid-state circuit breakers locked under current limiting mode for a predefined period of time, the solid-state circuit breaker returns to normal mode after the time period.

For anticipated transients, process 300 proceeds from conditional 303 to operation 321 where the controller selects a current limiting mode, just as the controller selected a current limiting mode in operation 307. After selecting the current limiting mode, process 300 proceeds to operation 323 where the controller operates the solid-state circuit breaker in the selected operating mode, just as in operation 309. Process 300 then proceeds to operation 317 where the controller continues to monitor the anticipated transient until the transient terminates. Process 300 then proceeds to operation 319 where the controller operates the solid-state circuit breaker in normal mode.

Figure 4A:
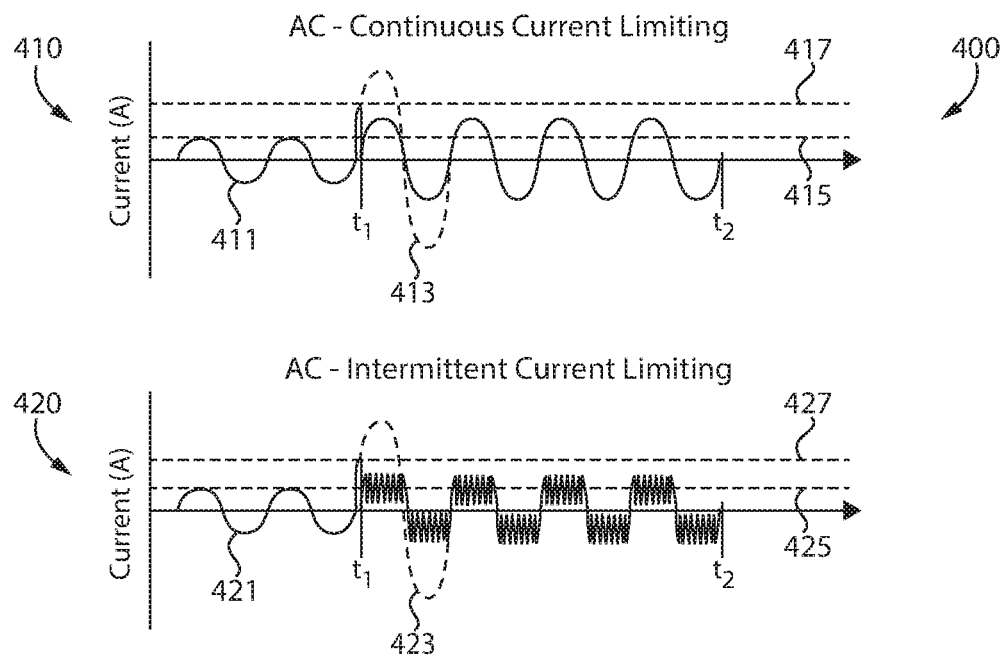
FIG. 4A is a plurality of graphs illustrating electrical characteristics of an exemplary solid-state circuit breaker in an alternating current (AC) power system.

With reference to FIG. 4A, there is a plurality of graphs 400 illustrating AC conducted by an exemplary solid-state circuit breaker during a fault. The plurality of graphs 400 includes graphs 410 and 420. Graph 410 illustrates AC conducted by the solid-state circuit breaker in continuous current limiting mode. Graph 410 includes an output current 411 line representing current output from the solid-state circuit breaker. Graph 410 also includes a nominal current peak 415 line representing the nominal current peak of the current conducted by the solid-state circuit breaker during normal operation, and a high current threshold 417 line representing a magnitude of current above which a controller of the solid-state circuit breaker will determine a high magnitude current is being conducted. In the illustrated embodiment, high current threshold 417 is twice the magnitude of nominal current peak 415. In other embodiments, high current threshold 417 may be a different multiple of nominal current peak 415.

At time instant $t_1$ of graph 410, the high current condition begins and output current 411 begins to rise. Without current limiting by the solid-state circuit breaker, output current 411 would conform to the waveform illustrated by fault current line 413. Although fault current line 413 shows only one cycle, the fault current would continue until the fault is identified and cleared. Instead, the solid-state circuit breaker enters the continuous current limiting mode in response to output current 411 exceeding high current threshold 417. By entering continuous current limiting mode, the peaks of output current 411 are reduced to one and a half times the magnitude of the nominal current peaks. In other embodiments, the peaks of output current 411 may be reduced to a different multiple of the magnitude of the nominal current peaks. The solid-state circuit breaker continues to operate in continuous current limiting mode until time instant $t_2$ where a solid-state circuit breaker or a mechanical breaker in FIG. 2 closest to the fault location opens in response to determining the high magnitude current is due to a fault. Although time instant $t_2$ is illustrated as a zero-crossing point, the solid-state circuit breaker or the closest breaker may also open while conducting a current.

Graph 420 illustrates AC conducted by the solid-state circuit breaker in intermittent current limiting mode. Graph 420 includes an output current 421 line representing current output from the solid-state circuit breaker. Graph 420 also includes a nominal current peak 425 line representing the nominal current peak of the current conducted by the solid-state circuit breaker during normal operation, and a high current threshold 427 line representing a magnitude of current above which a controller of the solid-state circuit breaker will determine a high magnitude current is being conducted. In the illustrated embodiment, high current threshold 427 is twice the magnitude of nominal current peak 425. In other embodiments, high current threshold 427 may be a different multiple of nominal current peak 425.

At time instant $t_1$ of graph 420, a high current condition begins to occur and output current 421 begins to increase. Without current limiting by the solid-state circuit breaker, output current 421 would conform to the waveform illustrated by fault current line 423. Although fault current line 413 shows only one cycle, the fault current would continue until the fault is identified and cleared. Instead, the solid-state circuit breaker enters the intermittent current limiting mode in response to output current 421 exceeding high current threshold 427. By entering intermittent current limiting mode, the peaks of output current 421, generated by repeatedly toggling the solid-state switching device, are reduced to one and a half times the magnitude of the nominal current peaks. In other embodiments, the peaks of output current 421 may be reduced to a smaller multiple of the magnitude of the nominal current peaks. The solid-state circuit breaker continues to operate in intermittent current limiting mode until time instant $t_2$ where a solid-state circuit breaker or a mechanical breaker in FIG. 2 closest to the fault location opens in response to determining the high magnitude current is due to a fault. Although time instant $t_2$ is illustrated as a zero-crossing point, the solid-state circuit breaker or the closest breaker may also open while conducting a current.

Figure 4B:
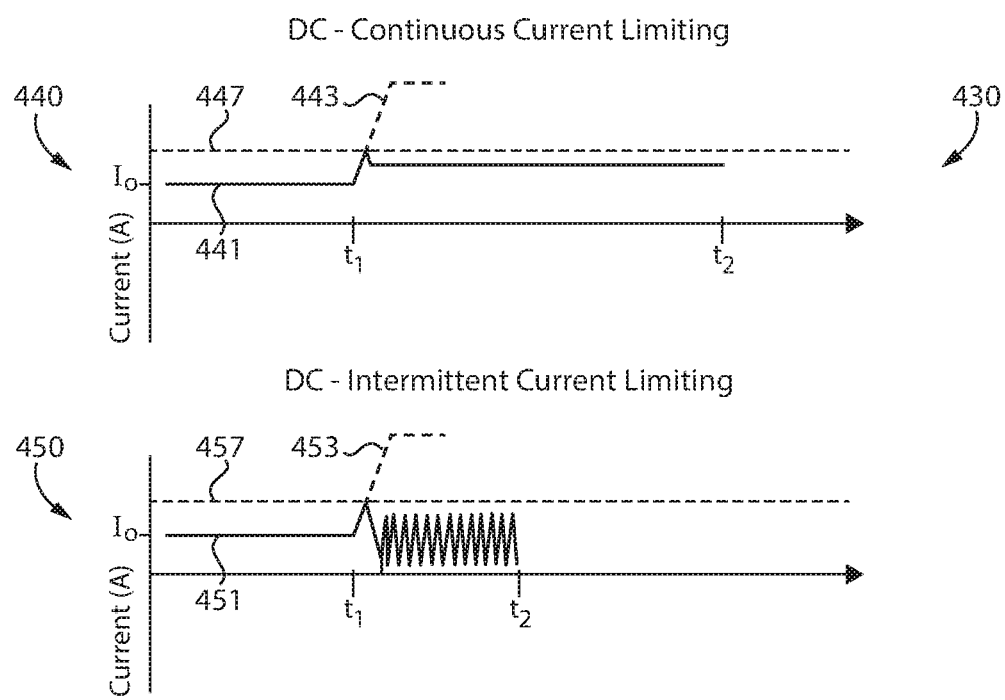
FIG. 4B is a plurality of graphs illustrating electrical characteristics of an exemplary solid-state circuit breaker in a direct current (DC) power system.

With reference to FIG. 4B, there is a plurality of graphs 430 illustrating DC conducted by an exemplary solid-state circuit breaker during a fault. The plurality of graphs 430 includes graphs 440 and 450. Graph 440 illustrates DC conducted by the solid-state circuit breaker in continuous current limiting mode. Graph 440 includes an output current 441 line representing current output from the solid-state circuit breaker. Graph 440 also includes a high current threshold 447 line representing a magnitude of current above which a controller of the solid-state circuit breaker will determine a high magnitude current is being conducted. In the illustrated embodiment, high current threshold 447 is twice the magnitude of nominal current $I_0$. In other embodiments, high current threshold 447 may be a different multiple of nominal current $I_0$.

At time instant $t_1$ of graph 440, a high current condition begins to occur and output current 441 begins to increase. Without current limiting by the solid-state circuit breaker, output current 441 would conform to the waveform illustrated by fault current line 443 until the fault is identified and the solid-state circuit breaker would open, interrupting output current 443. Instead, the solid-state circuit breaker enters the continuous current limiting mode in response to output current 441 exceeding high current threshold 447. By entering continuous current limiting mode, the magnitude of the output current 441 is reduced to one and a half times the magnitude of the nominal current magnitude. In other embodiments, the magnitude of output current 441 may be reduced to a different multiple of the magnitude of the nominal current. The solid-state circuit breaker continues to operate in continuous current limiting mode until time instant $t_2$ where a solid-state circuit breaker or a mechanical breaker in FIG. 2 closest to the fault location opens in response to determining the high magnitude current is due to a fault.

Graph 450 illustrates DC conducted by the solid-state circuit breaker in intermittent current limiting mode. Graph 450 includes an output current 451 line representing current output from the solid-state circuit breaker. Graph 450 also includes a high current threshold 457 line representing a magnitude of current above which a controller of the solid-state circuit breaker will determine a high magnitude current is being conducted. In the illustrated embodiment, high current threshold 457 is twice the magnitude of nominal current $I_0$. In other embodiments, high current threshold 457 may be a different multiple of nominal current $I_0$.

At time instant $t_1$ of graph 450, a high current condition begins to occur and output current 451 begins to increase. Without current limiting by the solid-state circuit breaker, output current 451 would conform to the waveform illustrated by fault current line 453 until the fault is identified and the solid-state circuit breaker would open, interrupting output current 453. Instead, the solid-state circuit breaker enters the intermittent current limiting mode in response to output current 451 exceeding high current threshold 457. By entering intermittent current limiting mode, the peaks of output current 451, generated by repeatedly toggling the solid-state switching device, are one and a half times the magnitude of nominal current $I_0$. In other embodiments, the peaks of output current 451 may be a smaller multiple of the magnitude of the nominal current peaks. The solid-state circuit breaker continues to operate in intermittent current limiting mode until time instant $t_2$ where the solid-state circuit breaker or another breaker in FIG. 2 closest to the fault location opens in response to determining the high magnitude current is due to a fault.

Figure 5A:
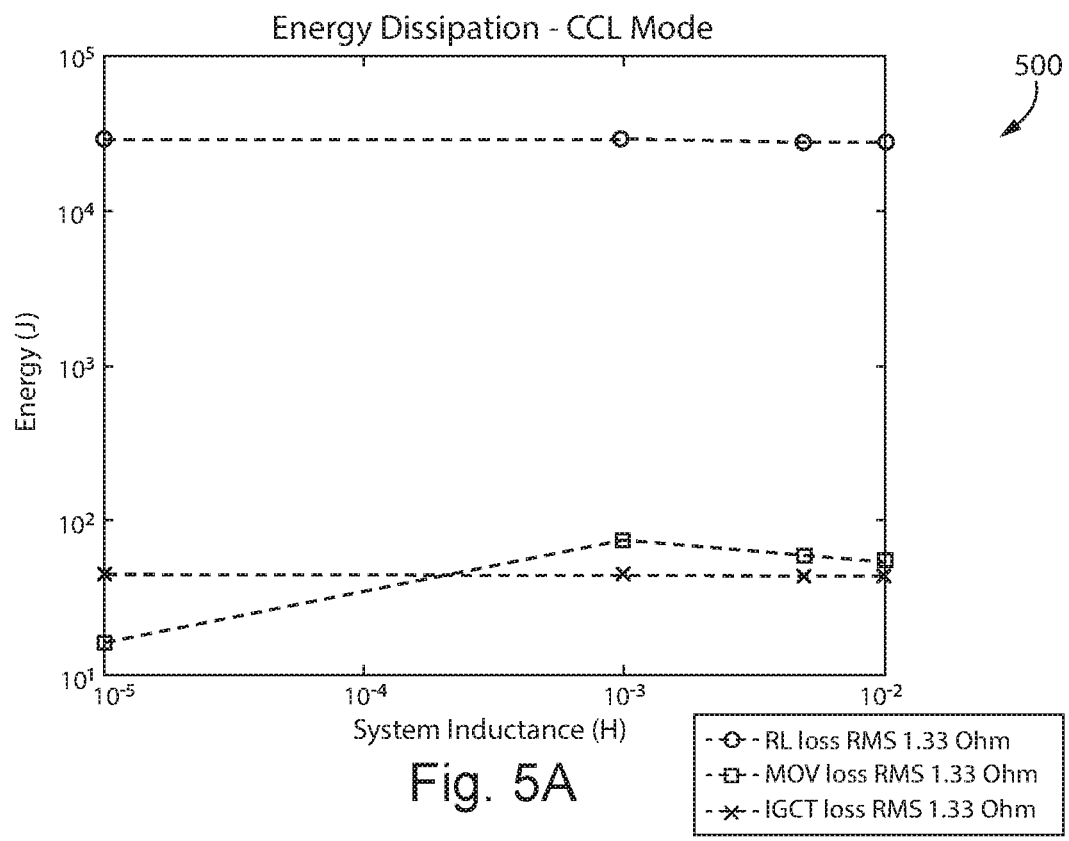
FIG. 5A is a graph illustrating energy dissipation during an exemplary continuous current limiting mode.

With reference to FIG. 5A, there is a graph 500 illustrating energy dissipation of an exemplary solid-state circuit breaker while operating in continuous current limiting mode, wherein the solid-state device of the solid-state circuit breaker includes an IGCT, the energy dissipation branch includes an MOV, and the assistive branch includes a resistor having a resistance of 1.33 Ohms. Graph 500 includes energy dissipation values for each parallel branch of the solid-state circuit breaker over a range of system inductances between $10^{-5}$ H to $10^{-2}$ H. As illustrated in graph 500, energy dissipation in the assistive branch is significantly higher than the energy dissipation in either the solid-state switching device or the energy dissipation branch, due to the single turnoff of the solid-state switching device during continuous current limiting mode.

Figure 5B:
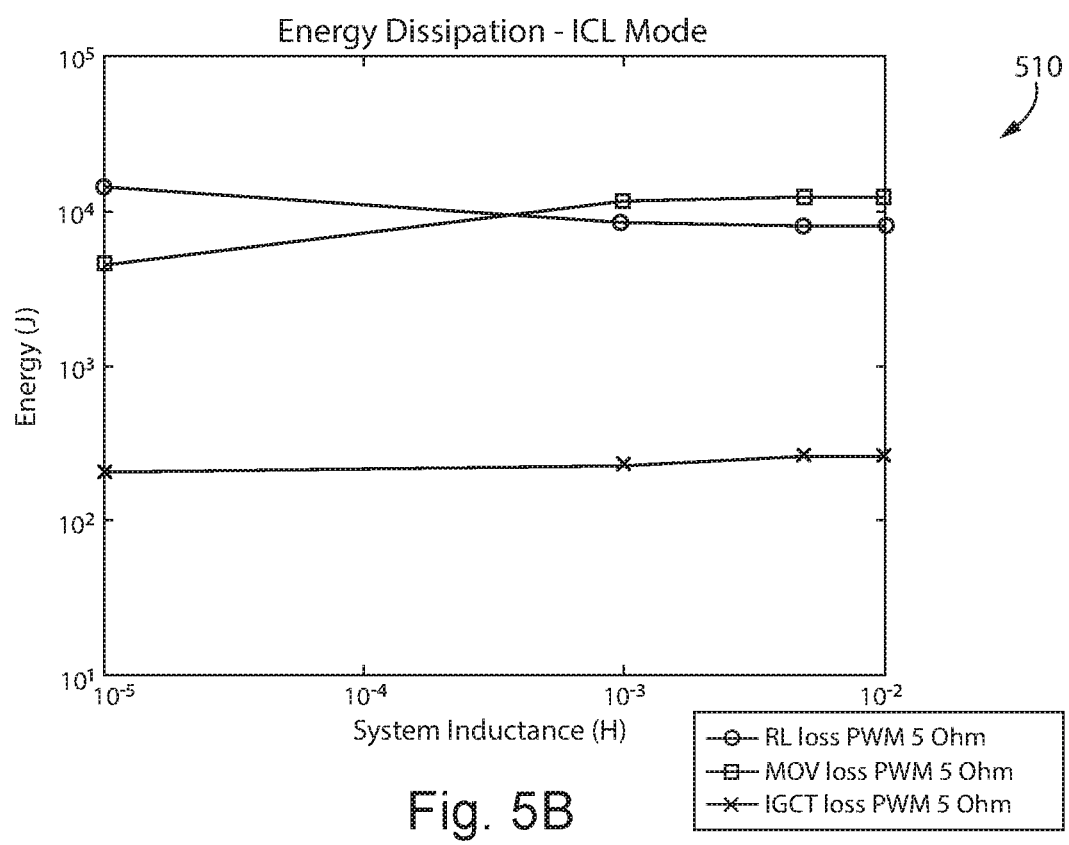
FIG. 5B is a graph illustrating energy dissipation during an exemplary intermittent current limiting mode.

With reference to FIG. 5B, there is a graph 510 illustrating energy dissipation of an exemplary solid-state circuit breaker while operating in intermittent current limiting mode, wherein the solid-state device of the solid-state circuit breaker includes an IGCT, the energy dissipation branch includes an MOV, and the assistive branch includes a resistor having a resistance of 5 Ohms. Graph 510 includes energy dissipation values for each parallel branch of the solid-state circuit breaker over a range of system inductances between $10^{-5}$ H to $10^{-2}$ H. As illustrated in graph 510, energy dissipation in the assistive branch and the energy dissipation branch is equal for one system inductance and shared for the illustrated range of system inductances. The resistance of the assistive branch may be resized in order for the energy dissipation of the energy dissipation branch and the assistive branch to be equal at a different system inductance.

Figure 6A:
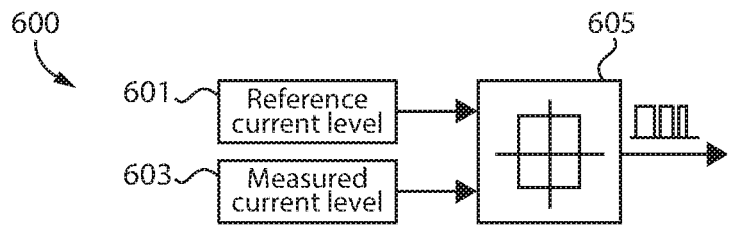
FIGS. 6A-6C illustrate exemplary control methods for the exemplary intermittent current limiting mode.
Figure 6B:
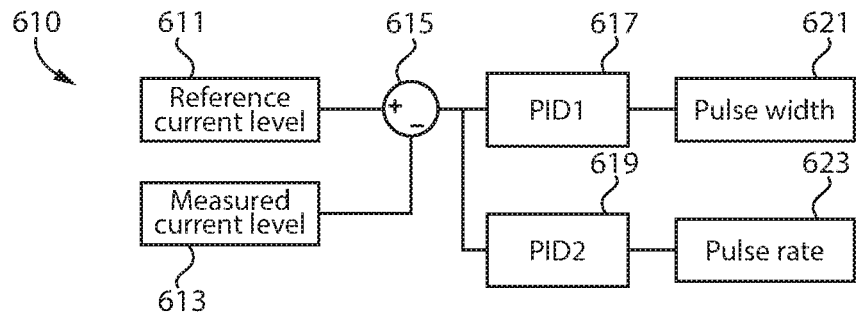
Figure 6C:
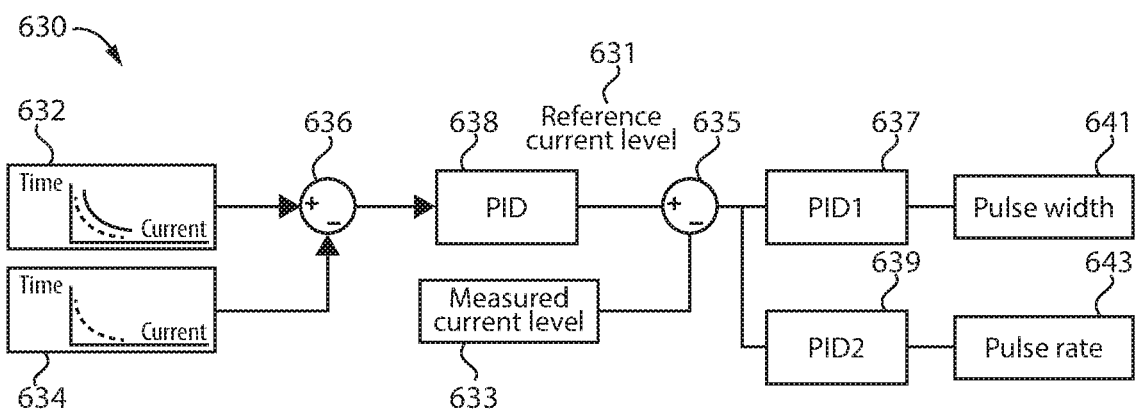

With reference to FIGS. 6A-6C, there are exemplary control algorithms of an exemplary solid-state circuit breaker controller for determining switch toggling patterns during intermittent current limiting mode. For hysteresis algorithm 600 illustrated in FIG. 6A, the controller determines a current reference value 601 and receives a current magnitude measurement 603. Using reference 601 and measurement 603, the controller calculates an adjustment 605 to the switch-toggling pattern to move the output current magnitude closer to the current reference value.

For feedback control algorithm 610 illustrated in FIG. 6B, the controller determines a current reference value 611 and receives a current magnitude measurement 613. Operator 615 calculates the difference between reference 611 and measurement 613. Proportional-integral-derivative (PID) controller 617 receives the difference from operator 615 and outputs a pulse width 621. PID controller 619 receives the difference from operator 615 and outputs a pulse rate 623.

For two-level feedback control algorithm 610 illustrated in FIG. 6C, the controller determines a current reference value 631 using variable time current curves. Operator 636 calculates the difference between a previous time current curve and an adjusted time current curve 632. The controller adjusts the time current curve based on operating conditions of the solid-state circuit breaker. The controller allows a different let-through energy to be conducted by the solid state circuit breaker with the adjusted time current curve. A higher let-through energy is allowed when the time current is adjusted upwards. Proportional-integral-derivative (PID) controller 638 receives the calculated difference from operator 636 and outputs current reference value 631. Operator 635 calculates the difference between reference 631 and a received current magnitude measurement 633. PID controller 637 receives the difference from operator 635 and outputs a pulse width 641. PID controller 639 receives the difference from operator 635 and outputs a pulse rate 643.

Further written description of a number of exemplary embodiments shall now be provided. One embodiment is a power system comprising a solid-state circuit breaker including a solid-state switching device, an energy dissipation branch coupled in parallel with the solid-state switching device, the energy dissipation branch including an energy dissipation device, an assistive branch coupled in parallel with the solid-state switching device, the assistive branch including a resistor, an inductor, and a switching device coupled together in series, and a controller configured to determine the solid-state circuit breaker is conducting a high magnitude current, select a continuous current limiting mode or an intermittent current limiting mode, and operate the solid-state switching device in the selected current limiting mode.

In certain forms of the foregoing power system, operating the solid-state switching device in the intermittent current limiting mode includes repeatedly toggling the solid-state switching device using a series of pulses. In certain forms, operating the solid-state switching device in the continuous current limiting mode includes opening the solid-state switching device and not closing the solid-state switching device. In certain forms, the controller selects the intermittent current limiting mode if operating the solid-state switching device in the continuous current limiting mode would not reduce a magnitude of the high magnitude current to a current reference value. In certain forms, the controller selects the continuous current limiting mode or the intermittent current limiting mode based on a current reference value and a power quality requirement, including at least one of a voltage distortion threshold and a current distortion threshold. In certain forms, the controller is configured to update a time current curve of the solid-state circuit breaker based on operating conditions of the solid-state circuit breaker, wherein the controller is configured to determine a pulse width of one pulse of the series of pulses based on the updated time current curve, and wherein the controller is configured to determine a pulse rate for a portion of the series of pulses based on the updated time current curve. In certain forms, the resistor is sized so that equal portions of energy of the high magnitude current are dissipated by the energy dissipation branch and the assistive branch while operating the solid-state switching device in the intermittent current limiting mode. In certain forms, the resistor is sized so that a first amount of energy dissipated by the energy dissipation branch is within 30 percent of a second amount of energy dissipated by the assistive branch while operating the solid-state switching device in the intermittent current limiting mode. In certain forms, the power system includes a plurality of solid-state circuit breakers, wherein the controller is configured to determine a cause of the high magnitude current is a fault, and wherein the controller is configured to determine the solid-state circuit breaker is closer to the fault than the plurality of solid-state circuit breakers and begin to operate the solid-state circuit breaker in a protection mode in response to determining the solid-state circuit breaker is closer to the fault than the plurality of solid-state circuit breakers. In certain forms, the controller is configured to determine a cause the high magnitude current is a transient, and wherein the controller is configured to continue to operate the solid-state switching device in the selected current limiting mode until the transient terminates.

Another exemplary embodiment is a method comprising operating a solid-state circuit breaker including a solid-state switching device, an energy dissipation branch coupled in parallel with the solid-state switching device and including an energy dissipation device, an assistive branch coupled in parallel with the solid-state switching device and including a resistor, an inductor, and a switching device coupled together in series; determining the solid-state circuit breaker is conducting a high magnitude current; select a continuous current limiting mode or an intermittent current limiting mode; and operate the solid-state switching device in the selected current limiting mode.

In certain forms of the foregoing method, operating the solid-state switching device in the intermittent current limiting mode includes repeatedly toggling the solid-state switching device. In certain forms, operating the solid-state switching device in the continuous current limiting mode includes opening the solid-state switching device and not closing the solid-state switching device. In certain forms, selecting the continuous current limiting mode or the intermittent current limiting mode includes selecting the intermittent current limiting mode if operating the solid-state switching device based on the continuous current limiting mode would not reduce a magnitude of the high magnitude current to a current reference value. In certain forms, selecting the continuous current limiting mode or the intermittent current limiting mode is based on a current reference value and a power quality requirement including at least one of a voltage distortion threshold and a current distortion threshold. In certain forms, operating the solid-state switching device in the intermittent current limiting mode updating a time current curve of the solid-state circuit breaker based on operating conditions of the solid-state circuit breaker, determine a pulse width of one pulse of a series of pulses based on the updated time current curve, and determining a pulse rate for a portion of the series of pulses based on the updated time current curve. In certain forms, the resistor is sized so that equal portions of energy of the high magnitude current are dissipated by the energy dissipation branch and the assistive branch while operating the solid-state switching device in the intermittent current limiting mode. In certain forms, the resistor is sized so that a first amount of energy dissipated by the energy dissipation branch is within 30 percent of a second amount of energy dissipated by the assistive branch while operating the solid-state switching device in the intermittent current limiting mode. In certain forms, the method comprises determining a cause of the high magnitude current is a fault; determining the solid-state circuit breaker is closer to the fault than a plurality of solid-state circuit breakers of the power system; and operating the solid-state circuit breaker in a protection mode in response to determining the solid-state circuit breaker is closer to the fault than the plurality of solid-state circuit breakers. In certain forms, the controller is configured to determine a cause the high magnitude current is a transient, and wherein the controller is configured to continue to operate the solid-state switching device in the selected current limiting mode until the transient terminates.

While the present disclosure has been illustrated and described in detail in the drawings and foregoing description, the same is to be considered as illustrative and not restrictive in character, it being understood that only certain exemplary embodiments have been shown and described, and that all changes and modifications that come within the spirit of the present disclosure are desired to be protected. It should be understood that while the use of words such as "preferable," "preferably," "preferred" or "more preferred" utilized in the description above indicate that the feature so described may be more desirable, it nonetheless may not be necessary, and embodiments lacking the same may be contemplated as within the scope of the present disclosure, the scope being defined by the claims that follow. In reading the claims, it is intended that when words such as "a," "an," "at least one," or "at least one portion" are used there is no intention to limit the claim to only one item unless specifically stated to the contrary in the claim. The term "of" may connote an association with, or a connection to, another item, as well as a belonging to, or a connection with, the other item as informed by the context in which it is used. The terms "coupled to," "coupled with" and the like include indirect connection and coupling, and further include but do not require a direct coupling or connection unless expressly indicated to the contrary. When the language "at least a portion" and/or "a portion" is used, the item can include a portion and/or the entire item unless specifically stated to the contrary.

What is claimed is:

1. A power system comprising:
   a solid-state circuit breaker including:
   a solid-state switching device,
   an energy dissipation branch coupled in parallel with the solid-state switching device, the energy dissipation branch including an energy dissipation device,
   an assistive branch coupled in parallel with the solid-state switching device, the assistive branch including a resistor, an inductor, and a switching device coupled together in series, and
   a controller configured to determine the solid-state circuit breaker is conducting a high magnitude current, select a continuous current limiting mode or an intermittent current limiting mode, and operate the solid-state switching device in the selected current limiting mode,
   wherein operating the solid-state switching device in the intermittent current limiting mode includes repeatedly toggling the solid-state switching device using a series of pulses.

2. The power system of claim 1, wherein operating the solid-state switching device in the continuous current limiting mode includes opening the solid-state switching device and not closing the solid-state switching device.

3. The power system of claim 2, wherein the controller selects the intermittent current limiting mode if operating the solid-state switching device in the continuous current limiting mode would not reduce a magnitude of the high magnitude current to a current reference value.

4. The power system of claim 2, wherein the controller selects the continuous current limiting mode or the intermittent current limiting mode based on a current reference value and a power quality requirement, including at least one of a voltage distortion threshold and a current distortion threshold.

5. The power system of claim 2, wherein the controller is configured to update a time current curve of the solid-state circuit breaker based on operating conditions of the solid-state circuit breaker, wherein the controller is configured to determine a pulse width of one pulse of the series of pulses based on the updated time current curve, and wherein the controller is configured to determine a pulse rate for a portion of the series of pulses based on the updated time current curve.

6. The power system of claim 1, wherein the resistor is sized so that equal portions of energy of the high magnitude current are dissipated by the energy dissipation branch and the assistive branch while operating the solid-state switching device in the intermittent current limiting mode.

7. The power system of claim 1, wherein the resistor is sized so that a first amount of energy dissipated by the energy dissipation branch is within 30 percent of a second amount of energy dissipated by the assistive branch while operating the solid-state switching device in the intermittent current limiting mode.

8. The power system of claim 1, wherein the power system includes a plurality of solid-state circuit breakers, wherein the controller is configured to determine a cause of the high magnitude current is a fault, and wherein the controller is configured to determine the solid-state circuit breaker is closer to the fault than the plurality of solid-state circuit breakers and begin to operate the solid-state circuit breaker in a protection mode in response to determining the solid-state circuit breaker is closer to the fault than the plurality of solid-state circuit breakers.

9. The power system of claim 1, wherein the controller is configured to determine a cause the high magnitude current is a transient, and wherein the controller is configured to continue to operate the solid-state switching device in the selected current limiting mode until the transient terminates.

10. A method comprising:
    operating a solid-state circuit breaker including a solid-state switching device, an energy dissipation branch coupled in parallel with the solid-state switching device and including an energy dissipation device, an assistive branch coupled in parallel with the solid-state switching device and including a resistor, an inductor, and a switching device coupled together in series;
    determining the solid-state circuit breaker is conducting a high magnitude current;
    selecting a continuous current limiting mode or an intermittent current limiting mode; and
    operating the solid-state switching device in the selected current limiting mode;
    wherein operating the solid-state switching device in the intermittent current limiting mode includes repeatedly toggling the solid-state switching device.

11. The method of claim 10, wherein operating the solid-state switching device in the continuous current limiting mode includes opening the solid-state switching device and not closing the solid-state switching device.

12. The method of claim 11, wherein selecting the continuous current limiting mode or the intermittent current limiting mode includes selecting the intermittent current limiting mode if operating the solid-state switching device based on the continuous current limiting mode would not reduce a magnitude of the high magnitude current to a current reference value.

13. The method of claim 11, wherein selecting the continuous current limiting mode or the intermittent current limiting mode is based on a current reference value and a power quality requirement including at least one of a voltage distortion threshold and a current distortion threshold.

14. The method of claim 10, wherein operating the solid-state switching device in the intermittent current limiting mode updating a time current curve of the solid-state circuit breaker based on operating conditions of the solid-state circuit breaker, determine a pulse width of one pulse of a series of pulses based on the updated time current curve, and determining a pulse rate for a portion of the series of pulses based on the updated time current curve.

15. The method of claim 10, wherein the resistor is sized so that equal portions of energy of the high magnitude current are dissipated by the energy dissipation branch and the assistive branch while operating the solid-state switching device in the intermittent current limiting mode.

16. The method of claim 10, wherein the resistor is sized so that a first amount of energy dissipated by the energy dissipation branch is within 30 percent of a second amount of energy dissipated by the assistive branch while operating the solid-state switching device in the intermittent current limiting mode.

17. The method of claim 10, comprising:
   determining a cause of the high magnitude current is a fault;
   determining the solid-state circuit breaker is closer to the fault than a plurality of solid-state circuit breakers of a power system; and
   operating the solid-state circuit breaker in a protection mode in response to determining the solid-state circuit breaker is closer to the fault than the plurality of solid-state circuit breakers.

18. The method of claim 10, wherein a controller is configured to determine a cause the high magnitude current is a transient, and wherein the controller is configured to continue to operate the solid-state switching device in the selected current limiting mode until the transient terminates.

\* \* \* \* \*